United States Patent
Annema et al.

(10) Patent No.: US 6,736,717 B1
(45) Date of Patent: May 18, 2004

(54) METHOD FOR OBTAINING AN INNER FILLET FROM A POULTRY CARCASS PART AND DEVICE FOR PROCESSING A POULTRY CARCASS PART

(75) Inventors: Hein Annema, Stevensbeek (NL); Petrus Chr. H. Janssen, Wilbertoord (NL); Adrianus J. van den Nieuwelaar, Gemert (NL)

(73) Assignee: Stork PMT B.V. (NL)

( * ) Notice: Subject to any disclaimer, the term of this patent is extended or adjusted under 35 U.S.C. 154(b) by 0 days.

(21) Appl. No.: 09/621,023

(22) Filed: Jul. 21, 2000

(30) Foreign Application Priority Data

Jul. 23, 1999 (NL) .............................................. 1012683

(51) Int. Cl.[7] .............................................. A22C 21/00
(52) U.S. Cl. ...................... 452/172; 452/151; 452/165
(58) Field of Search ................................ 452/135, 136, 452/149, 151, 165, 172

(56) References Cited

U.S. PATENT DOCUMENTS

| | | | |
|---|---|---|---|
| 4,873,746 A | * 10/1989 | Scheier et al. ............... | 452/136 |
| 5,314,374 A | 5/1994 | Koch et al. .................. | 452/136 |
| 5,370,573 A | 12/1994 | Warren et al. ............... | 452/149 |
| 5,395,283 A | 3/1995 | Gasbarro ..................... | 452/172 |
| 5,411,434 A | * 5/1995 | McGoon et al. ............ | 452/151 |
| 5,984,770 A | * 11/1999 | Asano et al. ................ | 452/165 |
| 6,007,416 A | * 12/1999 | Janssen et al. .............. | 452/135 |
| 6,558,243 B2 | * 5/2003 | Minemura et al. .......... | 452/155 |

FOREIGN PATENT DOCUMENTS

| | | |
|---|---|---|
| EP | 0 254 332 A1 | 1/1988 |
| EP | 0 551 156 A1 | 7/1993 |
| EP | 0 695 506 A2 A3 | 2/1996 |
| EP | 813814 | * 12/1997 |
| JP | 03049639 | 3/1991 |
| JP | 10-33110 | * 2/1998 |
| JP | 10-66504 | * 3/1998 |

OTHER PUBLICATIONS

Patent Cooperation Treaty (PCT) Report Concerning Novelty Search of International Type issued in priority NL 1012683 and its English translation.

* cited by examiner

Primary Examiner—Darren W. Ark
(74) Attorney, Agent, or Firm—Kristin L. Johnson; Mitchell G. Stockwell; Kilpatrick Stockton LLP

(57) ABSTRACT

Method for obtaining an inner fillet and device for mechanically detaching the undesired tendon part from an inner fillet. The poultry carcass is mounted on a fixing member and positioned so that the tendons are exposed. A processing device, comprising rotating cutters, either partially or completely detaches the tendon from the inner fillets. The cutters make a uniform incision at the moment when the inner fillet and the associated tendon are still essentially in their natural position. The fillets may then be removed manually or mechanically from the carcass.

18 Claims, 3 Drawing Sheets

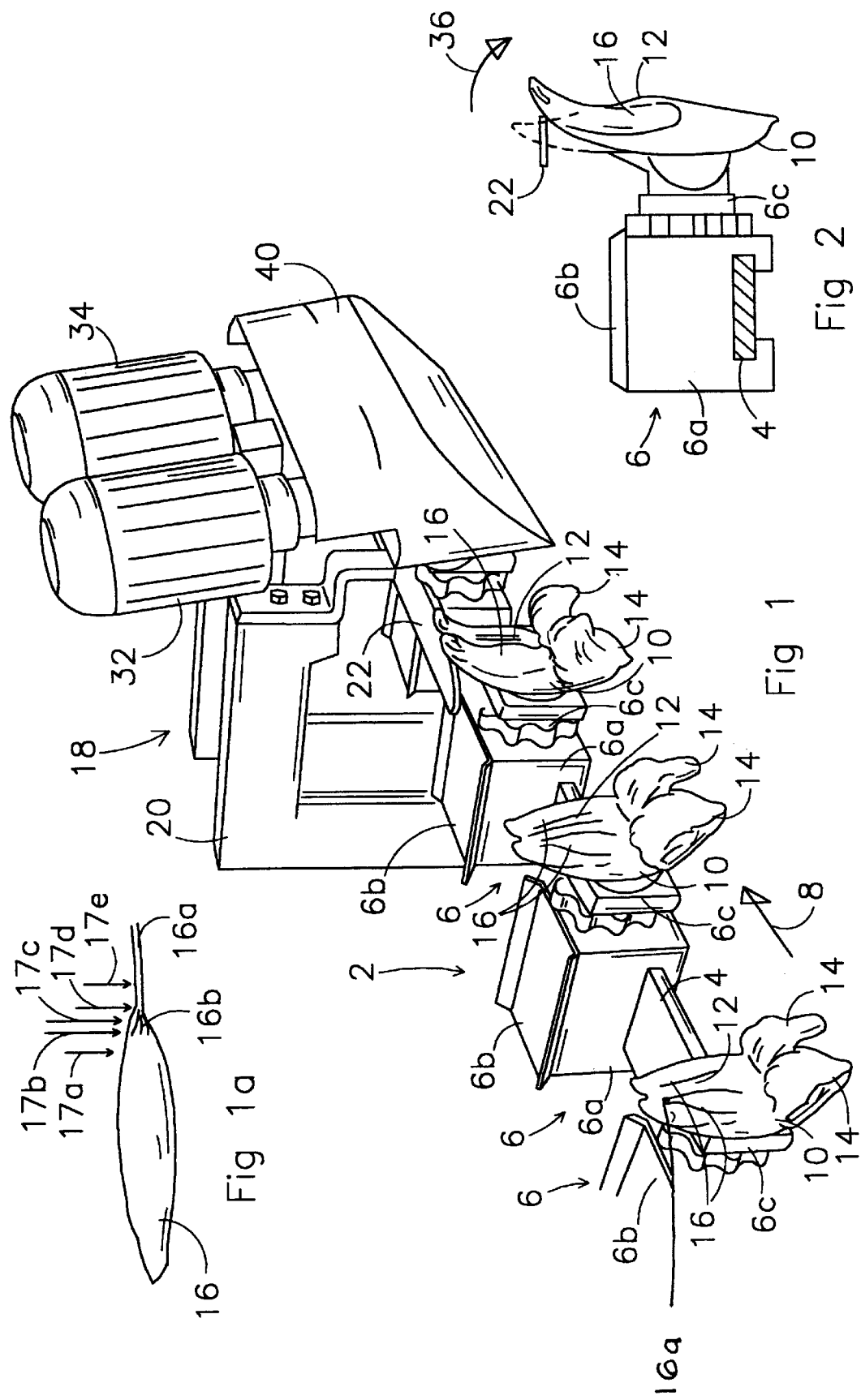

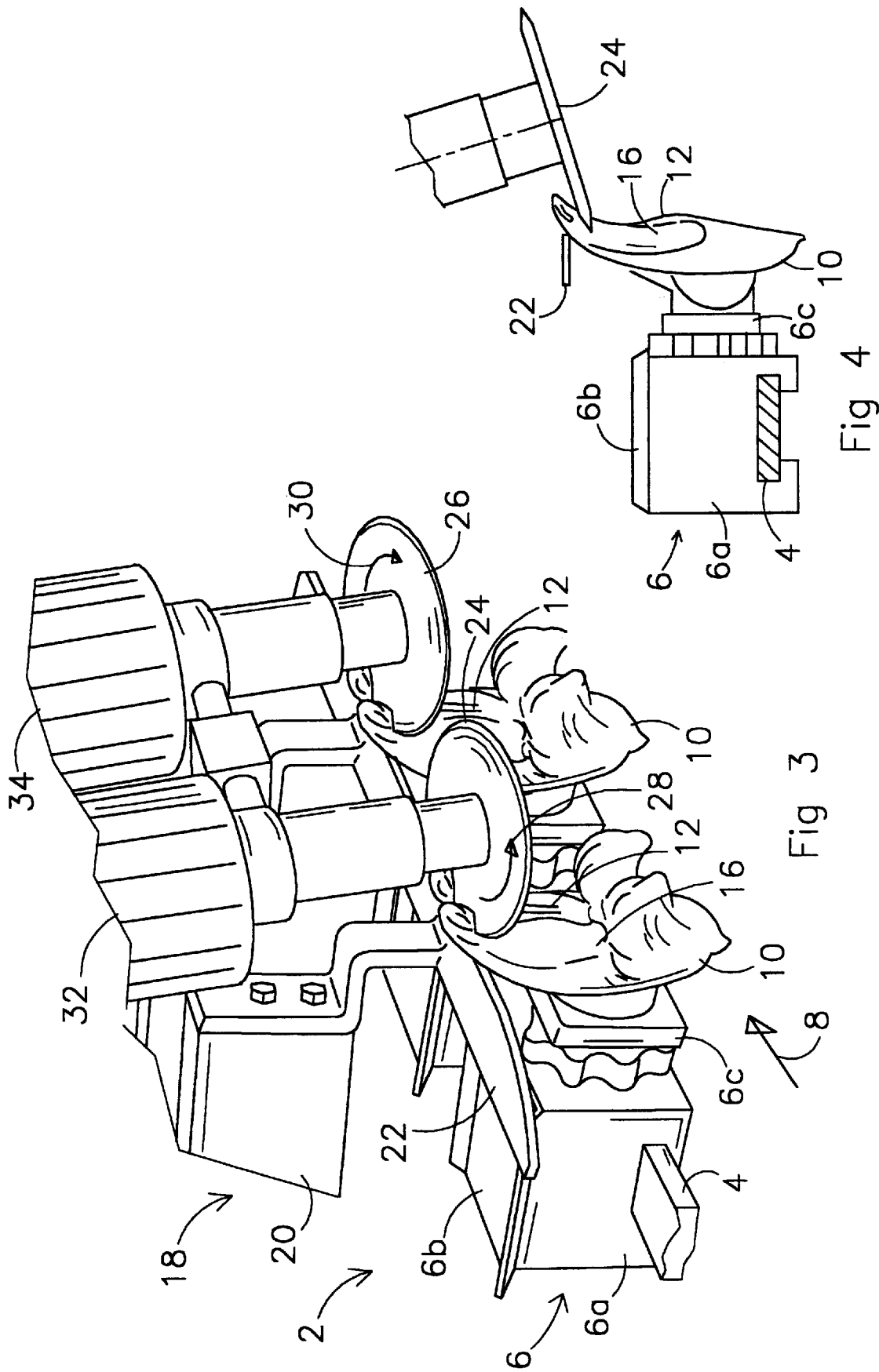

METHOD FOR OBTAINING AN INNER FILLET FROM A POULTRY CARCASS PART AND DEVICE FOR PROCESSING A POULTRY CARCASS PART

CROSS-REFERENCE TO RELATED APPLICATION

This application claims priority to Netherlands Application No. 1012683 filed on Jul. 23, 1999.

FIELD OF THE INVENTION

This invention relates to a method for obtaining an inner fillet from a poultry carcass part and to a device for processing a carcass part, for the purpose of obtaining the inner fillet from the carcass part.

DISCUSSION OF THE PRIOR ART

The inner fillets, also called tenders, of poultry, such as chickens or turkeys, are positioned on the breastbone (sternum) on both sides of the crest (crista sterni) thereof and are some of the most valuable meat parts of the poultry.

Removing the inner fillets from a carcass according to the prior art, as described in EP-A-0,695,506, is done by removing the wings from the carcass part, making a separation in the opening bounded by the wishbone and the breastbone, and then scraping away the inner fillets from the carcass part. According to U.S. Pat. No. 5,314,374, another method of removing inner fillets is partially cutting and scraping away inner fillets from a carcass part without wings, and then pulling away the inner fillets from the carcass part by means of gripping members. According to EP-A-0,695,506 still another way of removing inner fillets involves separating the membrane connections between the inner fillets and the breastbone, cutting open the canalis triosseus, and pulling away the inner fillets by means of the wings connected thereto through tendons.

A common drawback of the above-mentioned methods is that at least part of the tendon, which connects the inner fillet with the associated wing, remains connected to the removed inner fillet. To process the inner fillets into high value consumer products, such as "nuggets" in which tendon parts are undesirable, the tendons must subsequently be removed. The removal of tendons from the inner fillets usually must be done manually. This method requires a considerable use of expensive human labor, may be imprecise and consequently result in only moderate quality meat, and compromises the hygiene of the meat.

U.S. Pat. No. 5,395,283 discloses a device for automatically cutting off a part from the tendon connected to each inner fillet from inner fillets conveyed in trays. The inner fillets are placed and positioned in the trays manually. No solution is provided for removing the complete undesired tendon part from an inner fillet.

SUMMARY OF THE INVENTION

The object of the invention is to provide a method and a device for mechanically detaching (either partially or completely) the undesired tendon part from an inner fillet. The poultry carcass is mounted on a fixing member and positioned so that the tendons are exposed. A processing device, comprising rotating cutters, either partially or completely detaches the tendon from the inner fillets. The cutters make a uniform incision at the moment when the inner fillet and the associated tendon are still essentially in their natural positions. The fillets may then be removed manually or mechanically from the carcass. The automated method and device according to the invention results in substantial savings in labor costs, as well as improving the quality and accuracy of the processing.

BRIEF DESCRIPTION OF THE DRAWINGS

FIG. 1 is a perspective view of a part of a filleting line with a processing device according to the invention.

FIG. 1a is a side elevation view of an inner fillet with a part of the tendon attached.

FIG. 2 is a side elevation view demonstrating the operation of a guide of the processing device according to the invention.

FIG. 3 is a perspective view of the processing device according to FIG. 1 without the protective hood.

FIG. 4 is a side elevation view demonstrating the operation of the processing device according to FIG. 1.

DESCRIPTION OF THE PREFERRED EMBODIMENTS

Figure 5:
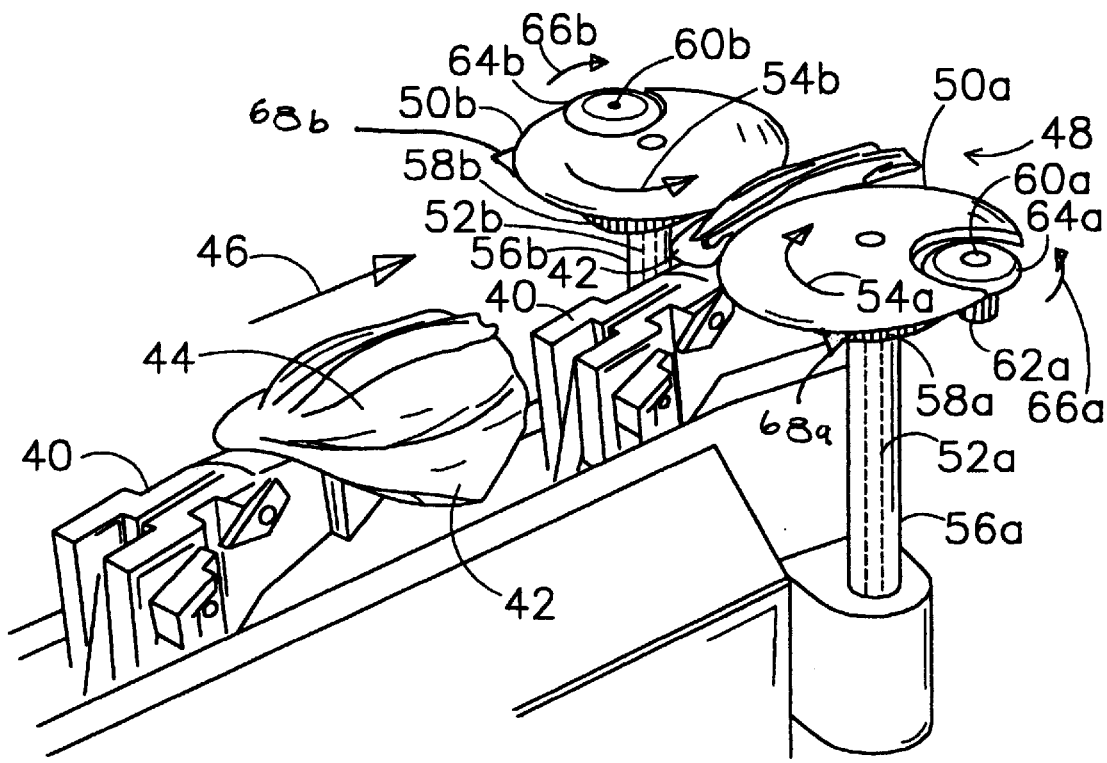
FIG. 5 is a perspective view of another embodiment of a processing device according to the present invention.

FIGS. 1, 2, 3, and 4 show a filleting line 2 in which carriers 6 are moved in the direction of arrow 8 along a rail 4. Each carrier 6 comprises a basic body 6a with a tray 6b on which obtained fillet parts can be placed if desired. At the side of the basic body 6a a poultry part fixing member 6c is provided, which is rotatable in a controlled manner around an axis which is directed centrally through the poultry part fixing member 6c and transverse to the side of basic body 6a. A so-called breast cap 10 (a breast part without skin, without clavicula, without wings, with ribs, and with or without a part of the back) of poultry is fixed on the poultry part fixing member 6c in such a way that the longitudinal axis of the breastbone 12 thereof is directed essentially vertically.

In FIG. 1, the outer fillets 14 of the breast cap 10 are partially pulled away, exposing at least a part of inner fillets 16 facing the shoulder joint, with attached tendons running to the shoulder joint. In FIGS. 2–4 the outer fillets 14 are absent. The inner fillets 16 essentially are in their natural position and are attached to the breastbone 12 with membranes. The tendon part to be removed from each inner fillet 16 extends essentially to inside the canalis triosseus. The longitudinal direction of the inner fillets 16 is essentially at right angles to the conveyance direction 8.

In the filleting line, a processing device 18 secured to a frame 20 is placed fixed relative to the rail 4. The processing device 18 comprises a guide 22 and two rotating cutters 24, 26 (FIG. 3) driven in opposite directions according to respective arrows 28 and 30 by means of respective motors 32 and 34. As shown in FIGS. 1, 3 and 4, the axis of rotation of the motors 32, 34 is oblique relative to a vertical line. In FIG. 1 a protective hood 40 is placed around the rotating cutters 24, 26 to protect operators.

FIG. 1a shows the inner fillet 16, a tendon 16a attached thereto, and a tendon attachment 16b. Arrows 17a, 17b, 17c, 17d and 17e indicate different positions where an incision in the area of the tendon attachment 16b can be made according to the invention. The incision 17a is in the inner fillet 16 outside the tendon attachment 16b. The incision 17b is in the inner fillet 16 at the edge of the tendon attachment 16b. The incision 17c is in the inner fillet 16 in the tendon attachment 16b. The incision 17d is at the end of the inner fillet 16 on the transition of the tendon attachment 16b to the tendon 16a. The incision 17e is in the tendon 16a.

As shown in FIGS. 2 and 4, the breast cap 10 is tilted away by the guide 22 in the area of the collar bones (os coracoidus) at the back side of the breast cap 10 in the direction of arrow 36, and thus is positioned at an angle relative to the rotating cutters 24, 26. In this way, the rotating cutters 24, 26 are prevented from cutting into bone parts, releasing undesired bone residues. The rotating cutters 24, 26 are positioned to either partially or completely detach the tendon from the inner fillet. The rotating cutters 24, 26 are situated one behind the other in the path of the breast cap 10 for a certain incision 17a, 17b, 17c, 17d or 17e essentially at right angles to the longitudinal direction of both inner fillets 16. It is also possible to use only one rotating cutter or to use one or more stationary or resiliently positioned cutters. It is also possible to reverse the directions of rotation 28 and 30. The cutters do not merely have a cutting function, but also a positioning function by the cutting forces exerted on the breast cap 10 relative to the guide 22. The position or height of incision is adjustable by varying the placement of the motors 32, 34 on the frame 20, taking into account the dimensions of the breast caps 10 or inner fillets.

After the incision of the breast cap 10, the inner fillets 16 are removed manually or mechanically, the undesired tendon parts remaining on the carcass.

It is to be observed here that the envisaged incision, which in practice will be a cutting-through or a near-cutting-through, can be obtained not only by one or more cutters, but also with other cutting means, such as a water jet.

Further it is to be observed that the cutting means may not only be situated stationary along the conveyance path of the conveyor, but can also be made movable for bringing them synchronously with the conveyance of the carriers into the path of the carcass parts for providing the envisaged incision. The carcass part may be conveyed intermittently, and may stand still at the time of incision.

Also it is to be observed that it is not essential to the invention that the wings be removed from the carcass part to be processed in the processing device 18. If the carcass part comprises wings, these wings can be simply kept outside the working range of the rotating cutters 24, 26 or other cutting means by means of suitable guides, such that in spite of the presence of wings the intended incision is obtained.

Further it is to be observed that the tendon incision can also be obtained by conveying the breast cap 10 with the breastbone 12 parallel to the arrow 8 and having cutters or other cutting means engage the inner fillet or tendon parts to be incised from the sides of the breast cap 10. This is explained in more detail with reference to an example embodiment shown in FIG. 5.

FIG. 5 shows carriers 40 on which front halves 42 of poultry with inner fillets 44 are conveyed in the direction of arrow 46. A cutting device 48 is situated stationary along the conveyance path of the front halves 42. The cutting device 48 comprises two disks 50a, 50b which are driven through respective axes 52a, 52b (indicated with dashed lines) in the direction of respective arrows 54a, 54b by means of drive devices not shown in detail. The axes 52a, 52b rotate inside stationary jackets 56a and 56b, respectively, on which under the respective disks 50a, 50b respective gear rings 58a, 58b are provided. On each disk 50a, 50b, a rotating cutter 64a, 64b, respectively, is mounted rotatable around a respective axis 60a, 60b, and provided with a respective gear wheel 62a, 62b (not visible) engaging the respective gear ring 58a, 58b. The edges of the disks 50a, 50b are not cutting. The cutters 64a, 64b rotate in opposite directions 66a, 66b, respectively, by the rotation of the disks 50a, 50b in the respective directions 54a, 54b, the angular velocity of the cutters 64a, 64b being greater than the angular velocity of the disks 50a, 50b, and the circumferential speed of the disks 50a, 50b preferably being greater than the conveyance speed of the front halves 42. The rotation of the disks 50a, 50b is synchronized with the carriers 40 such that the cutters 64a, 64b engage subsequent front halves 42 always at the same place. The cutters 64a, 64b cut into or through the tendons 16a of the inner fillets 44, in particular above the tendon attachment 16b of the tendons 16a to the inner fillets 44. The longitudinal direction of the inner fillets 44 is essentially parallel to, or at a small angle to, the conveyance direction 46. The disks 50a, 50b may be provided with supplemental cutting means 68a, 68b for breaking membrane connections between the breastbone of the front half 42 and the inner fillets 44.

The functions performed by the disks 50a, 50b and cutters 64a, 64b, 68a and 68b, may also be performed with suitably placed stationary or moving guides and cooperating stationary or moving cutting means which engage carcass parts provided on carriers which are moved continuously or intermittently.

It is also possible not to place the carcass parts on top of the carriers, but to place them below carriers, the breastbone being directed downwards from the carrier. This situation is, for example, obtained by rotating the carriers 40 through 180 degrees around a horizontal longitudinal or transverse axis.

While the invention has been described and illustrated in its preferred embodiments, it should be understood that departures may be made therefrom within the scope of the invention, which is not limited to the details disclosed herein.

We claim:

1. A device for processing a poultry carcass part, comprising:
   a conveyor with at least one carrier for carrying a carcass part to be moved along a conveyance path in a conveyance direction, wherein the carcass part comprises at least a breastbone, an at least partially exposed inner fillet being essentially in a natural position, and a tendon attached to the inner fillet in an area of attachment, wherein the plane of symmetry of the breastbone extends essentially in a plane at right angles or parallel to the conveyance direction; and
   cutting means for at least partially severing the at least partially exposed inner fillet from the tendon by providing an incision in the inner fillet or the tendon in the area of attachment of the tendon to the inner fillet.

2. The device of claim 1, wherein the plane of symmetry of the breastbone extends essentially in a plane parallel to the conveyance direction and wherein the cutting means comprises at least one cutter which is rotatingly driven around an axis of rotation.

3. The device of claim 2, wherein the device further comprises at least one support, rotatingly driven around an axis of rotation, for supporting the at least one cutter, wherein the axis of rotation of the at least one cutter is situated eccentrically relative to the axis of rotation of the at least one support.

4. The device of claim 3, wherein the direction of rotation of the at least one cutter is opposite to the direction of rotation of the at least one support.

5. The device of claim 2, wherein the at least one cutter rotates in a direction opposite to the conveyance direction at a location along the conveyance path where the at least one cutter is engaged with the carcass part.

6. A device for processing a poultry carcass part, comprising:

a conveyor with at least one carrier for carrying a carcass part to be moved along a conveyance path in a conveyance direction, wherein the carcass part comprises at least a breastbone, an at least partially exposed inner fillet being essentially in a natural position, and a tendon attached to the inner fillet in an area of attachment, wherein the plane of symmetry of the breastbone extends essentially in a plane at right angles to the conveyance direction when the carcass part is carried by the carrier; and cutting means for at least partially severing the at least partially exposed inner fillet from the tendon by providing an incision in the inner fillet or the tendon in the area of attachment of the tendon to the inner fillet.

7. The device of claim 6, further comprising a guide extending essentially in the conveyance direction for guiding a back side of the carcass part, wherein the cutting means cooperates with the guide.

8. The device of claim 6, wherein the cutting means comprise at least one rotatingly driven cutter having an axis of rotation.

9. The device of claim 8, wherein the axis of rotation of the cutter is directed at an acute angle to the longitudinal direction of the carcass part to be incised.

10. The device of claim 6, wherein the cutting means comprises a first cutter and a second cutter, wherein the first cutter and the second cutter are located adjacent along a length of the conveyance path and wherein the first cutter rotates in a direction opposite the second cutter.

11. The device of claim 10, wherein the second cutter rotates in a direction opposite to the conveyance direction at a location along the conveyance path where the second cutter is engaged with the carcass part.

12. A method for obtaining an inner fillet from a poultry carcass part, comprising:

(a) retracting at least part of an outer fillet of the carcass part to expose at least a part of an inner fillet of the carcass part facing a shoulder of the carcass part and a tendon attached to the inner fillet, wherein the tendon is attached to the inner fillet in an area of attachment and wherein the inner fillet is essentially in its natural position on the carcass part;

(b) at least partially severing the at least partially exposed inner fillet from the tendon by providing an incision in the inner fillet or the tendon in the area of attachment of the tendon to the inner fillet; and (c) separating the inner fillet from the carcass part.

13. The method of claim 12, wherein the incision is directed essentially transverse to the longitudinal direction of the inner fillet.

14. The method of claim 12, further comprising conveying the carcass part on a carrier along a conveyance path in a conveyance direction along cutting means for performing the incision.

15. The method of claim 14, wherein the longitudinal direction of the inner fillet is essentially transverse to the conveyance direction.

16. The method of claim 14, wherein the longitudinal direction of the inner fillet is essentially parallel to the conveyance direction.

17. The method of claim 14, wherein the longitudinal direction of the inner fillet is at a small angle to the conveyance direction.

18. The method of claim 14, wherein the longitudinal direction of the inner fillet is essentially transverse to the conveyance direction or essentially parallel to the conveyance direction.

* * * * *